United States Patent
Kim et al.

(10) Patent No.: US 11,557,791 B2
(45) Date of Patent: Jan. 17, 2023

(54) NON-AQUEOUS ELECTROLYTE FOR LITHIUM SECONDARY BATTERY AND LITHIUM SECONDARY BATTERY COMPRISING SAME

(71) Applicant: SAMSUNG SDI CO., LTD., Yongin-si (KR)

(72) Inventors: Kyoung Soo Kim, Yongin-si (KR); Yunhee Kim, Yongin-si (KR); Yongchan You, Yongin-si (KR); Erang Cho, Yongin-si (KR); Seonju Choi, Yongin-si (KR)

(73) Assignee: SAMSUNG SDI CO., LTD., Yongin-si (KR)

(*) Notice: Subject to any disclaimer, the term of this patent is extended or adjusted under 35 U.S.C. 154(b) by 389 days.

(21) Appl. No.: 16/638,514

(22) PCT Filed: Aug. 7, 2018

(86) PCT No.: PCT/KR2018/008948
§ 371 (c)(1),
(2) Date: Feb. 12, 2020

(87) PCT Pub. No.: WO2019/050167
PCT Pub. Date: Mar. 14, 2019

(65) Prior Publication Data
US 2020/0365940 A1    Nov. 19, 2020

(30) Foreign Application Priority Data
Sep. 6, 2017 (KR) .................. 10-2017-0113934

(51) Int. Cl.
*H01M 10/0567* (2010.01)
*H01M 10/0525* (2010.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

| 6,783,896 B2 | 8/2004 | Tsujioka et al. |
| 7,241,536 B2 | 7/2007 | Kim et al. |

(Continued)

FOREIGN PATENT DOCUMENTS

| CN | 1385919 A | 12/2002 |
| CN | 101197456 A | 6/2008 |

(Continued)

OTHER PUBLICATIONS

Z.-W. Xiao, Y.-J. Zhang, Y.-F. Wang. Synthesis of high-capacity LiNi0.8Co0.1Mn0.1O2 cathode by transition metal acetates, Trans. Nonferrous Met. Soc. China 25 (2015) 1568-1574.*

(Continued)

*Primary Examiner* — Carlos Barcena
(74) *Attorney, Agent, or Firm* — Lee IP Law, P.C.

(57) ABSTRACT

The present invention relates to a non-aqueous electrolyte for a lithium secondary battery and a lithium secondary battery comprising the same, the non-aqueous electrolyte comprising a non-aqueous organic solvent, a lithium salt, a first additive including at least one of compounds represented by chemical formulas 1 to 4, and a second additive comprising a cyclic sulfide-based compound, wherein the mixing ratio of the first additive and the second additive is a weight ratio of 0.2:1 to 10:1.

10 Claims, 1 Drawing Sheet

(51) Int. Cl.
*H01M 10/0568* (2010.01)
*H01M 4/505* (2010.01)
*H01M 4/525* (2010.01)

(52) U.S. Cl.
CPC ... *H01M 10/0525* (2013.01); *H01M 10/0568* (2013.01); *H01M 2300/0025* (2013.01)

(56) References Cited

U.S. PATENT DOCUMENTS

| | | |
|---|---|---|
| 2002/0197537 A1 | 12/2002 | Kim et al. |
| 2008/0138714 A1 | 6/2008 | Ihara et al. |
| 2008/0138715 A1 | 6/2008 | Ihara et al. |
| 2008/0193852 A1 | 8/2008 | Murai |
| 2011/0229770 A1 | 9/2011 | Yun et al. |
| 2012/0244419 A1 | 9/2012 | Kwak et al. |
| 2012/0301797 A1 | 11/2012 | Abe et al. |
| 2014/0113186 A1 | 4/2014 | Bhat et al. |
| 2016/0027592 A1 | 1/2016 | Shimamoto et al. |
| 2016/0164142 A1 | 6/2016 | Garsuch et al. |
| 2016/0248121 A1 | 8/2016 | Uematsu et al. |
| 2016/0372753 A1 | 12/2016 | Fukasawa |
| 2017/0117535 A1 | 4/2017 | Yoon et al. |
| 2018/0241084 A1 | 8/2018 | Miyasato et al. |

FOREIGN PATENT DOCUMENTS

| | | | |
|---|---|---|---|
| CN | 103107355 A | | 5/2013 |
| CN | 104600362 A | * | 5/2015 |
| CN | 104600362 A | | 5/2015 |
| CN | 105336987 A | | 2/2016 |
| CN | 105655640 A | | 6/2016 |
| JP | 2002-222648 A | | 8/2002 |
| JP | 2006244739 A | * | 9/2006 |
| JP | 2007-180025 A | | 7/2007 |
| JP | 2011049152 A | | 3/2011 |
| JP | 2011-049152 A | | 4/2015 |
| JP | 2015-072856 A | | 4/2015 |
| JP | 2016-197508 A | | 11/2016 |
| JP | 2017-045724 A | | 3/2017 |
| JP | 2017-168347 A | | 9/2017 |
| KR | 10-2011-0104391 A | | 9/2011 |
| KR | 10-2012-0109407 A | | 10/2012 |
| KR | 10-2012-0124424 A | | 11/2012 |
| KR | 10-2014-0020328 A | | 2/2014 |
| KR | 10-1480483 B1 | | 1/2015 |
| KR | 10-2015-0109057 A | | 10/2015 |
| KR | 10-2015-0139847 A | | 12/2015 |
| KR | 10-2016-0040708 A | | 4/2016 |
| KR | 10-2016-0058089 A | | 5/2016 |
| KR | 10-2017-0031636 A | | 3/2017 |
| WO | WO 2017/084109 A1 | | 5/2017 |
| WO | WO-2017084109 A1 | * | 5/2017 |
| WO | WO 2018/120792 A1 | | 5/2018 |

OTHER PUBLICATIONS

International Search Report dated Mar. 22, 2019 for PCT/KR2018/008948.
International Search Report dated Nov. 1, 2018 for PCT/KR2018/008758.
International Search Report dated Nov. 1, 2018 for PCT/KR2018/008743.
Ahn et al. "Combustion-synthesized LiNi0.6Mn0.2O2 as cathode material for lithium ion batteries," Journal of Alloys and Compounds 609 (2014) 143-149.
U.S. Office action from co-pending U.S. Appl. No. 16/638,522 dated Nov. 23, 2021.
U.S. Office action from co-pending U.S. Appl. No. 16/638,526 dated Feb. 3, 2022.
U.S. Office action from co-pending U.S. Appl. No. 16/638,526 dated Dec. 7, 2021.
Korean Office action dated Apr. 25, 2022 for corresponding Korean Patent Application No. 10-2017-0113934.
U.S. Office action dated Mar. 3, 2022 for co-pending U.S. Appl. No. 16/638,522.
U.S. Office action dated Apr. 14, 2022 for co-pending U.S. Appl. No. 16/638,522.
U.S. Office action dated May 2, 2022 for co-pending U.S. Appl. No. 16/638,526.
U.S. Office action received in co pending U.S. Appl. No. 16/638,522 dated Jun. 23, 2022.
Korean Office action received in related application, U.S. Appl. No. 16/638,522, dated May 18, 2022.
U.S. Advisory action received in co pending U.S. Appl. No. 16/638,526, dated Jul. 26, 2022.
U.S. Office action receiving in co pending U.S. Appl. No. 16/638,522, dated Sep. 21, 2022.
Chinese Office action dated Sep. 6, 2022.
U.S. Office action received in co pending application U.S. Appl. No. 16/638,526, dated Sep. 29, 2022.

* cited by examiner

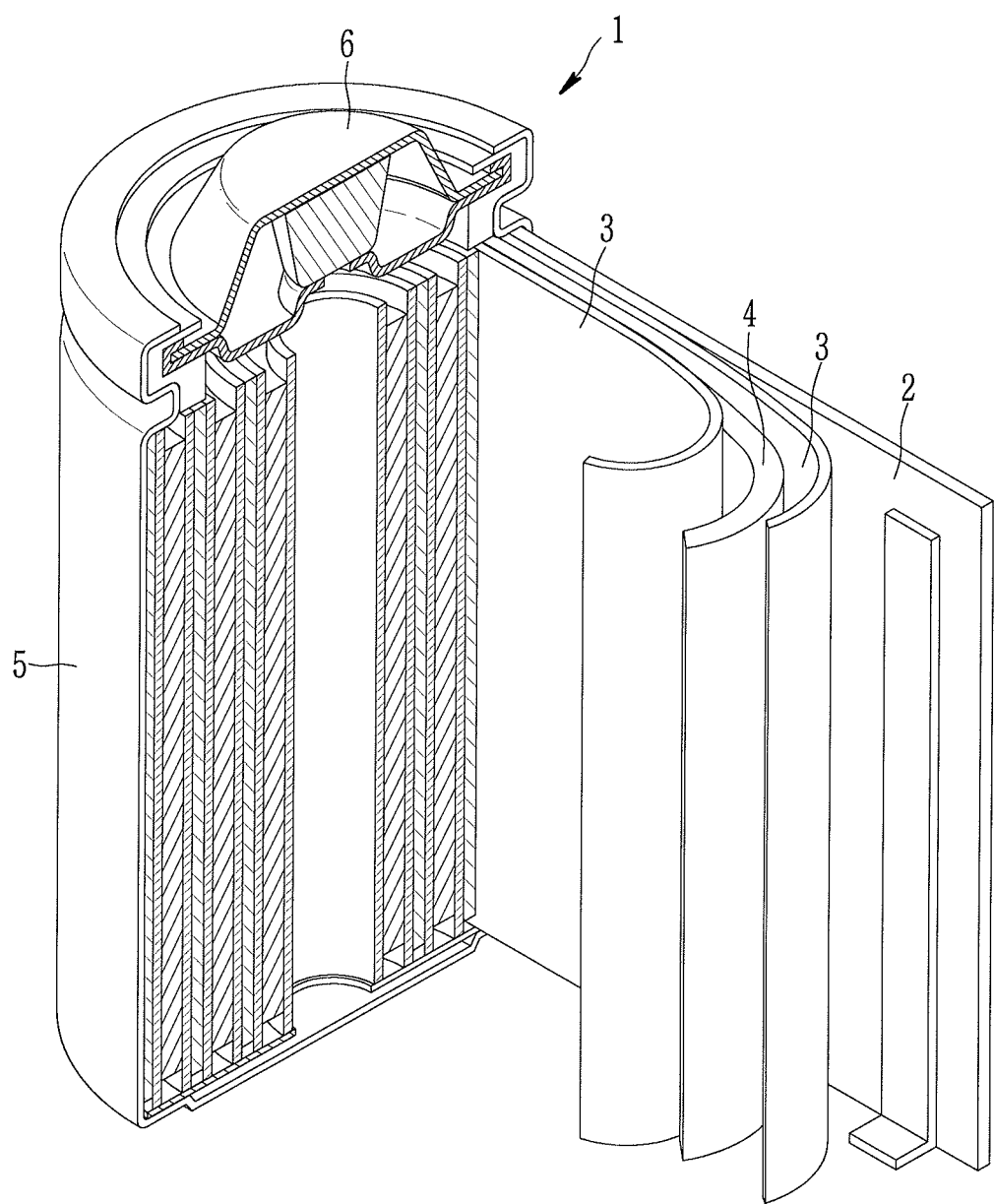

NON-AQUEOUS ELECTROLYTE FOR LITHIUM SECONDARY BATTERY AND LITHIUM SECONDARY BATTERY COMPRISING SAME

CROSS REFERENCE TO RELATED APPLICATIONS

This is the U.S. national phase application based on PCT/KR2018/008948, filed Aug. 7, 2018, which is based on Korean Patent Application No. 10-2017-0113934 filed on Sep. 6, 2017, the entire contents of all of which are hereby incorporated by reference.

TECHNICAL FIELD

A non-aqueous electrolyte for a lithium secondary battery and a lithium secondary battery including the same are disclosed.

BACKGROUND ART

Technology development for realizing high capacity of a lithium secondary battery has been continuously made due to an increasing demand on a mobile equipment or a portable battery.

As for a positive active material of a lithium secondary battery, a lithium-transition metal oxide having a structure capable of intercalating lithium ions such as $LiCoO_2$, $LiMn_2O_4$, $LiNi_{1-x}Co_xO_2$ (0<x<1), and the like has been used.

As for a negative active material for a lithium secondary battery, various carbon-based materials including artificial graphite, natural graphite, and hard carbon capable of intercalating and deintercalating lithium ions have been used.

As an electrolyte of a lithium secondary battery, a lithium salt dissolved in an organic solvent has been used.

DISCLOSURE

Technical Problem

An embodiment provides a non-aqueous electrolyte for a lithium secondary battery that is capable of improving output retention due to an improved resistance increase rate during a high temperature storage of the lithium secondary battery, and may reduce a gas generation amount.

Another embodiment provides a lithium secondary battery including the electrolyte.

Technical Solution

According to an embodiment, a non-aqueous electrolyte for a lithium secondary battery includes a non-aqueous organic solvent; a lithium salt; a first additive including at least one of compounds represented by Chemical Formulae 1 to 4; and a second additive including a cyclic sulfide-based compound, wherein a mixing ratio of the first cyclic additive and the second cyclic additive is a weight ratio of 0.2:1 to 10:1.

[Chemical Formula 1]

$$R^2-\underset{\underset{R^3}{|}}{\overset{\overset{R^1}{|}}{Si}}-O-\underset{\underset{O}{\|}}{\overset{\overset{O}{\|}}{S}}-O-\underset{\underset{R^4}{|}}{\overset{\overset{R^6}{|}}{Si}}-R^5$$

[Chemical Formula 2]

$$CX_3SO_3-\underset{\underset{R^7}{|}}{\overset{\overset{R^8}{|}}{Si}}-CX_3SO_3$$

[Chemical Formula 3]

$$R^9-\underset{\underset{O}{\|}}{\overset{\overset{O}{\|}}{S}}-O-Si(C_{m1}H_{2m1+1})_3$$

[Chemical Formula 4]

$$C_nX_{2n+1}-\underset{\underset{O}{\|}}{\overset{\overset{O}{\|}}{S}}-O-Si(C_{m2}H_{2m2+1})_3$$

In Chemical Formulae 1 to 4,
$R^1$ to $R^9$ are independently a primary, secondary, or tertiary alkyl group, an alkenyl group, or an aryl group,
X is hydrogen or a halogen atom,
n is an integer of 0 to 3, and
m1 and m2 are independently integers of 0 to 3.

The mixing ratio of the first cyclic additive and the second cyclic additive may be a weight ratio of 0.5:1 to 5:1.

The second additive may be 1,3-propene sultone, ethylene sulfate, methylene methane disulfonate, 1,4-butane sultone, 2,4-butane sultone, ethylene sulfite, propylene sulfite, sulfolane, or a combination thereof.

In addition, in an embodiment, the second additive may include a first cyclic additive including a cyclic sulfide-based compound and a second cyclic additive including a cyclic compound. The cyclic first additive and the second cyclic additive may be 1,3-propene sultone, ethylene sulfate, methylene methane disulfonate, 1,4-butane sultone, 2,4-butane sultone, ethylene sulfite, propylene sulfite, sulfolane, or a combination thereof, and the first cyclic additive and the second cyclic additive may be different from each other.

The mixing ratio of the first cyclic additive and the second cyclic additive may be a weight ratio of 0.5:1 to 1:1.

A content of the first additive may be 0.5 wt % to 5 wt % based on a total weight of the electrolyte.

A content of the second additive may be 0.5 wt % to 5 wt % based on a total weight of the electrolyte.

The first additive may be the compound represented by Chemical Formula 1, the compound represented by Chemical Formula 3, or a combination thereof.

According to another embodiment, a lithium secondary battery includes a negative electrode including a negative active material; a positive electrode including a positive active material; and the electrolyte.

In an embodiment, the positive active material may be a lithium nickel-based compound.

The positive active material may be a lithium nickel-based compound of Chemical Formula 5.

Chemical Formula 5

$Li_{a1}Ni_{x1}Co_{y1}Me_{z1}O_2$

In Chemical Formula 3,
0.9≤a1≤1.1, 0.6≤x1≤0.90, 0≤y1≤0.3, 0≤z1≤0.3, x1+y1+z1=1, and A is Mn or Al Other embodiments are included in the following detailed description.

Advantageous Effects

The non-aqueous electrolyte for a lithium secondary battery according to an embodiment may improve output retention due to an improved resistance increase rate at high temperature storage and may reduce a gas generation amount, providing a lithium secondary battery having improved high temperature storage characteristics.

DESCRIPTION OF THE DRAWINGS

The FIGURE is a schematic view showing a lithium secondary battery according to an embodiment of the present invention.

MODE FOR INVENTION

Hereinafter, embodiments of the present invention are described in detail. However, these embodiments are exemplary, the present invention is not limited thereto and the present invention is defined by the scope of claims.

An embodiment of the present invention provides an electrolyte including a non-aqueous organic solvent; a lithium salt; a first additive including at least one of compounds represented by Chemical Formulae 1 to 4; and a second additive including a cyclic sulfide-based compound. Particularly, a mixing ratio of the first cyclic additive and the second cyclic additive may be a weight ratio of 0.2:1 to 10:1. According to an embodiment, the mixing ratio of the first cyclic additive and the second cyclic additive may be a weight ratio of 0.5:1 to 5:1. When the mixing ratio of the first cyclic additive and the second cyclic additive is included in the range, an appropriate resistance increase rate may be obtained at high temperature storage. If the mixing ratio of the first cyclic additive and the second cyclic additive is out of the range, that is, if the content of the first additive is too small or excessive, the resistance increase rate at high temperature storage may be significantly reduced, which is not appropriate.

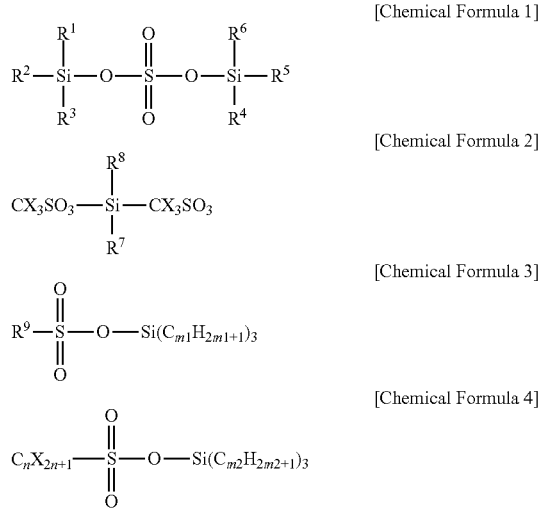

[Chemical Formula 1]

[Chemical Formula 2]

[Chemical Formula 3]

[Chemical Formula 4]

In Chemical Formulae 1 to 4, $R^1$ to $R^9$ are independently a primary, secondary, or tertiary alkyl group, an alkenyl group, or an aryl group, X is hydrogen or a halogen atom, n is an integer of 0 to 3, and m1 and m2 are independently integers of 0 to 3. The alkyl group may be a C1 to C9 alkyl group, the alkenyl group may be a C2 to C9 alkenyl group, and the aryl group may be a C6 to C12 aryl group.

The halogen atom may be F, Cl, Br, I, or a combination thereof. As such, when the first additive and the second additive are used together, particularly, at the above range, it is possible to effectively suppress a resistance increase during high temperature storage and to suppress a gas generation amount effectively.

A content of the first additive may be 0.5 wt % to 5 wt % based on a total weight of the electrolyte. If the content of the first additive is within the range, an appropriate resistance increase may be obtained at high temperature storage. If the content of the first additive is out of the range, the resistance increase rate at high temperature storage may increase significantly.

A content of the second additive may be 0.5 wt % to 5 wt % based on a total weight of the electrolyte. If the content of the second additive is within the range, $Li^+$ movement may be further promoted to further improve cycle-life characteristics. If the content of the second additive is out of the range, $Li^+$ movement may be inhibited to deteriorate cycle-life characteristics.

The second additive may be a cyclic sulfide-based compound that is 1,3-propene sultone, ethylene sulfate, methylene methane disulfonate, 1,4-butane sultone, 2,4-butane sultone, ethylene sulfite, propylene sulfite, sulfolane, or a combination thereof.

The second additive may be a cyclic sulfide-based compound which may include two or more types. That is, the second additive may include a first cyclic additive including a cyclic sulfide-based compound and a second cyclic additive including a cyclic compound. When two or more types of the second additives are included, the gas generation amount at high temperature storage may be reduced more effectively.

The first cyclic additive and the second cyclic additive may be a type of the sulfur compound and the first cyclic additive and the second cyclic additive may be different from each other.

The first cyclic additive may be 1,3-propene sultone, 1,4-butane sultone, 2,4-butane sultone, 1,3-propane sultone, or combination thereof, and the second cyclic additive may be ethylene sulfate, methylene methane disulfate, ethylene sulfonate, propylene sulfite, sulfolane, or a combination thereof.

As such, when two or more cyclic sulfur compounds are used, the mixing ratio of the first cyclic additive and the second cyclic additive may be a weight ratio of 0.5:1 to 1:1. When the mixing ratio of the first cyclic additive and the second cyclic additive are included within the range, a more appropriate resistance increase may be obtained when stored at high temperature. If the mixing ratio of the first cyclic additive and the second cyclic additive is out of the range, i.e., if the content of the first cyclic additive is lower or higher than the range, the resistance increase rate at high temperature storage may be greatly increased.

In an embodiment, the first additive may be the compound represented by Chemical Formula 1, the compound represented by Chemical Formula 3, or a combination thereof.

The non-aqueous organic solvent serves as a medium for transmitting ions taking part in the electrochemical reaction of a battery.

The non-aqueous organic solvent may be a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethyl propionate, propyl propionate, γ-butyrolactone, decanolide, valerolactone, mevalonolactone, caprolactone, and the like.

The ether-based solvent may include dibutyl ether, tetraglyme, diglyme, dimethoxyethane, 2-methyltetrahydrofuran, tetrahydrofuran, and the like and the ketone-based solvent may include cyclohexanone, and the like.

The alcohol-based solvent may include ethanol, isopropyl alcohol, and the like, and the aprotic solvent may include nitriles such as T-CN (wherein T may include a C2 to C20 linear, branched, or cyclic hydrocarbon group, a double bond, an aromatic ring, or an ether bond), and the like, amides such as dimethyl formamide, and the like, dioxolanes such as 1,3-dioxolane, and the like, sulfolanes, and the like.

The non-aqueous organic solvent may be used alone or in a mixture. When the organic solvent is used in a mixture, the mixture ratio may be controlled in accordance with a desirable battery performance.

When the non-aqueous organic solvent is used in a mixture, a mixed solvent of cyclic carbonate and chain carbonate, a mixed solvent of cyclic carbonate and a propionate-based solvent, or a mixed solvent of cyclic carbonate, chain carbonate, and a propionate-based solvent may be used. The propionate-based solvent may be methyl propionate, ethyl propionate, propyl propionate, or a combination thereof.

Herein, when the cyclic carbonate and the chain carbonate or the cyclic carbonate and the propionate-based solvent are mixed, they may be mixed in a volume ratio of 1:1 to 1:9 and thus performance of an electrolyte solution may be improved. In addition, when the cyclic carbonate, the chain carbonate, and the propionate-based solvent are mixed, they may be mixed in a volume ratio of 1:1:1 to 3:3:4. The mixing ratio of the solvents may be appropriately adjusted according to desirable properties.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 6.

[Chemical Formula 6]

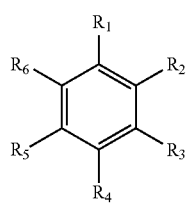

In Chemical Formula 6, $R^{10}$ to $R^{15}$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate or an ethylene carbonate-based compound of Chemical Formula 7 in order to improve a cycle-life of a battery.

[Chemical Formula 7]

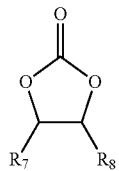

In Chemical Formula 7, $R^7$ and $R^8$ are independently selected from hydrogen, a halogen, a cyano group (CN), a nitro group ($NO_2$), and a fluorinated C1 to C5 alkyl group, provided that at least one of $R^7$ and $R^8$ is selected from a halogen, a cyano group (CN), a nitro group ($NO_2$), and a fluorinated C1 to C5 alkyl group and $R^7$ and $R^8$ are not simultaneously hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving a cycle-life may be used within an appropriate range.

The lithium salt dissolved in an organic solvent supplies a battery with lithium ions, basically operates the lithium secondary battery, and improves transportation of the lithium ions between positive and negative electrodes. Examples of the lithium salt include at least one supporting salt selected from $LiPF_6$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, for example an integer ranging from 1 to 20, LiCl, LiI, and $LiB(C_2O_4)_2$ (lithium bis(oxalato) borate: LiBOB). A concentration of the lithium salt may range from 0.1 M to 2.0 M. When the lithium salt is included at the above concentration range, an electrolyte may have excellent performance and lithium ion mobility due to optimal electrolyte conductivity and viscosity.

Another embodiment provides a lithium secondary battery including the electrolyte, a positive electrode including a positive active material, and a negative electrode including a negative active material.

The positive active material may include lithiated intercalation compounds that reversibly intercalate and deintercalate lithium ions. The lithiated intercalation compound may include the following examples.

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0≤b≤0.5, 0≤c≤0.05), $Li_aE_{2-b}X_bO_{4-c}D_c$ (0≤b≤0.5, $0 \leq c \leq 0.05$); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_\alpha$(0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1) $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$ $Li_{(3-f)}J_2(PO_4)_3$ (0≤f≤2); $Li_{(3-f)}Fe_2(PO_4)_3$ (0≤f≤2); $Li_aFePO_4$ (0.90≤a≤1.8)

In chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof, and J is selected from V, Cr, Mn, Co, Ni, Cu, and a combination thereof.

More suitable positive active materials may include lithium nickel-based compounds. The lithium nickel-based compound may be a nickel-rich compound represented by Chemical Formula 5.

Chemical Formula 5

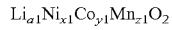

$Li_{a1}Ni_{x1}Co_{y1}Mn_{z1}O_2$

In Chemical Formula 5,
0.9≤a1≤1.1, 0.6≤x1≤0.9, 0≤y1≤0.3, 0≤z1≤0.3, and x1+y1+z1=1.

As described above, when the lithium nickel-based compound is used as the positive active material and the electrolyte including the first additive and the second additive is used together, an effect of reducing a resistance variation rate at high temperature storage and suppressing a gas decrease rate is further improved, which is appropriate.

Particularly, when the lithium nickel-based compound of Chemical Formula 5 is used as the positive active material, a large resistance variation rate and large gas generation at high temperature storage may be occurred, however, when the electrolyte including the first additive and the second additive according to an embodiment is used together, it is possible to effectively suppress the resistance variation rate and gas generation at high temperature storage and it is preferable to maximize an effect of using an electrolyte including the first additive and the second additive.

The positive electrode may include a current collector and a positive active material layer formed on the current collector and a positive active material layer including a positive active material.

In the positive electrode, a content of the positive active material may be 90 wt % to 98 wt % based on a total weight of the positive active material layer.

In an embodiment, the positive active material layer may further include a binder and a conductive material. Herein, each amount of the binder and the conductive material may be 1 wt % to 5 wt % based on a total weight of the positive active material layer.

The binder attaches positive active material particles to each other well and also attaches positive active materials to the current collector. Examples of the binder may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material is included to provide electrode conductivity and any electrically conductive material may be used as a conductive material unless it causes a chemical change. Examples of the conductive material may include a carbon-based material such as natural graphite, artificial graphite, carbon black, acetylene black, ketjen black, a carbon fiber and the like; a metal-based material of a metal powder or a metal fiber including copper, nickel, aluminum, silver, and the like; a conductive polymer such as a polyphenylene derivative; or a mixture thereof.

The current collector may include an aluminum foil, a nickel foil, or a combination thereof, but is not limited thereto.

The negative electrode includes a current collector and a negative active material layer formed on the current collector and including a negative active material.

The negative active material layer includes a negative active material, a binder and optionally, a conductive material.

The negative active material may include a material that reversibly intercalates/deintercalates lithium ions, a lithium metal, a lithium metal alloy, a material capable of doping/dedoping lithium, or a transition metal oxide.

The material that reversibly intercalates/deintercalates lithium ions may include a carbon material that is a generally-used carbon-based negative active material in a lithium secondary battery. Examples of the carbon-based negative active material may be crystalline carbon, amorphous carbon, or a mixture thereof. The crystalline carbon may be non-shaped, or sheet, flake, spherical, or fiber shaped natural graphite or artificial graphite, and the amorphous carbon may be a soft carbon, a hard carbon, a mesophase pitch carbonization product, fired coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be Si, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, but not Si), a Si-carbon composite, Sn, $SnO_2$, a Sn-R alloy (wherein R is an element selected from an alkali metal, an alkaline-earth metal, a Group 13 element, a Group 14 element, a Group 15 element, a Group 16 element, a transition metal, a rare earth element, and a combination thereof, but not Sn), a Sn-carbon composite, and the like and at least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide includes a lithium titanium oxide.

According to an embodiment, the negative active material may be a Si-carbon composite and the Si-carbon composite may include silicon particles and crystalline carbon. An average particle diameter (D50) of the silicon particles may be 10 nm to 200 nm. The Si-C composite may further include an amorphous carbon layer formed at at least a portion thereof. In the present specification, unless otherwise defined, an average particle diameter (D50) indicates a particle where a cumulative volume is 50 volume % in a particle distribution.

According to another embodiment, the negative active material may be used by mixing two or more negative active materials and for example, may include a Si-carbon composite as the first negative active material and crystalline carbon as the second negative active material. In the case of mixing two or more negative active materials as negative active materials, the mixing ratio thereof may be appropriately controlled, but a Si content may be adjusted to be 3 wt % to 50 wt % based on a total weight of the negative active material.

In the negative active material layer, the negative active material may be included in an amount of 95 wt % to 99 wt % based on the total weight of the negative active material layer. In the negative active material layer, a content of the binder may be 1 wt % to 5 wt % based on a total weight of the negative active material layer. When the conductive material is further included, 90 wt % to 98 wt % of the negative active material, 1 wt % to 5 wt % of the binder, and 1 wt % to 5 wt % of the conductive material may be used.

The binder attaches negative active material particles to each other well and also attaches negative active material to the current collector. The binder may include a non-water-soluble binder, a water-soluble binder, or a combination thereof.

The non-water-soluble binder may include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the negative electrode binder is a water-soluble binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metals may be Na, K, or Li. The thickener may be included in an amount of 0.1 parts by weight to 3 parts by weight based on 100 parts by weight of the negative active material.

The conductive material is included to provide electrode conductivity and any electrically conductive material may be used as a conductive material unless it causes a chemical change. Examples of the conductive material include a carbon-based material such as natural graphite, artificial graphite, carbon black, acetylene black, ketjen black, denka black, a carbon fiber, and the like; a metal-based material of a metal powder or a metal fiber including copper, nickel, aluminum silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The positive active material layer and the negative active material layer are formed by mixing an active material, a binder and optionally a conductive material in a solvent to prepare an active material composition, and coating the active material composition on a current collector. The electrode formation method is well known, and thus is not described in detail in the present specification. The solvent includes N-methyl pyrrolidone and the like, but is not limited thereto. When the water-soluble binder is used in the negative active material layer, a solvent used for preparing the negative active material composition may be water.

A separator may be present between the positive electrode and the negative electrode, depending on a type of a lithium secondary battery. Such a separator material may include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The FIGURE is an exploded perspective view of a lithium secondary battery according to an embodiment. A lithium secondary battery according to an embodiment is for example a cylindrical battery. However, the present invention is not limited thereto, and may be applied to various types of batteries such as a prismatic type, a pouch type, and the like.

Referring to the FIGURE, a lithium secondary battery 1 according to an embodiment includes an electrode assembly manufactured by winding a separator 3 interposed between a positive electrode 2 and a negative electrode 4, a case 5 housing the electrode assembly, and a sealing member 6 sealing the case 5. The positive electrode 10, the negative electrode 20, and the separator 30 may be impregnated in an electrolyte solution (not shown).

EXAMPLES FOR PERFORMING INVENTION

Hereinafter, examples of the present invention and comparative examples are described. These examples, however, are not in any sense to be interpreted as limiting the scope of the invention.

Examples 1 to 8 and Comparative Examples 1 to 6

Non-aqueous electrolytes for a lithium secondary battery were prepared by adding 1.15 M $LiPF_6$ to a mixed solvent (a volume ratio of 20:40:40) of ethylene carbonate, ethylmethyl carbonate, and dimethyl carbonate, and then, first and second additives to 100 wt % of the obtained mixture in each composition shown in Table 1.

The non-aqueous electrolytes, a positive electrode, and a negative electrode were used to manufacture cylindrical lithium secondary battery cells in a general method. Herein, 3 g of an electrolyte was injected thereinto.

The positive electrode was manufactured by mixing 96 wt % of a $LiNi_{0.6}Co_{0.2}Mn_{0.2}O_2$ positive active material, 2 wt % of ketjen black conductive material, and 2 wt % of polyvinylidene fluoride in an N-methylpyrrolidone solvent to prepare positive active material slurry, coating the positive active material slurry on an aluminum foil, and then, drying and compressing it.

The negative electrode was manufactured by mixing 96 wt % of an artificial graphite negative active material, 2 wt % of a ketjen black conductive material, and 2 wt % of polyvinylidene fluoride in an N-methylpyrrolidone solvent to prepare negative active material slurry, coating the negative active material slurry on a copper foil, and then, drying and compressing it.

Resistance variation rates were measured by storing the lithium secondary battery cells at 60° C. for 30 days and respectively measuring resistance before and after the storage. The results are shown in Table 1.

In addition, gas generation amounts before and after the storage at 60° C. for 30 days were respectively measured. The measured gas generation amounts were respectively used to obtain each difference, reduced value, from a gas generation amount of Comparative Example 1, and then, the differences were used to obtain percentages with respect to the gas generation amount of Comparative Example 1, and the results are shown in Table 1. In other words, when the gas generation amount of Comparative Example 1 was 10 mL, and the gas generation amount of Example 1 was 5.6 mL, a difference thereof was 4.4 mL, and accordingly, a gas decrease rate was 44%.

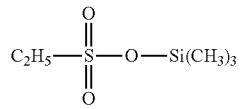

[Chemical Formula 3a]

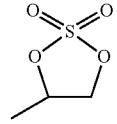

[Chemical Formula 10]

As shown in Table 1, Examples 1 to 8 using electrolytes including the first and second additives in a weight ratio of

TABLE 1

| | Additive 1 | | Additive 2 | | | First additive/Second additive weight ratio | Resistance variation rate after storage at 60° C. for 30 days | Gas decrease rate after storage at 60° C. for 30 days |
|---|---|---|---|---|---|---|---|---|
| | | | First cyclic additive | Second cyclic additive | | | | |
| | TESS | TMSES | PST | ESA | MMDS | PSA | | | |
| Example 1 | 1 | 0 | 0 | 1 | 0 | 0 | 1:1 | 22% | 44% |
| Example 2 | 1 | 0 | 0.5 | 0 | 0 | 0 | 2:1 | 20% | 55% |
| Example 3 | 1 | 0 | 0 | 0 | 1 | 0 | 1:1 | 16% | 25% |
| Example 4 | 1 | 0 | 0.5 | 1 | 0 | 0 | 0.67:1 | 20% | 60% |
| Example 5 | 1 | 0 | 1 | 1 | 0 | 0 | 0.5:1 | 18% | 60% |
| Example 6 | 1 | 0 | 0.5 | 0 | 1 | 0 | 0.67:1 | 16% | 58% |
| Example 7 | 1 | 0 | 2 | 0 | 0 | 0 | 0.5:1 | 20% | 70% |
| Example 8 | 0 | 1 | 1 | 1 | 0 | 0 | 0.5:1 | 20% | 65% |
| Example 9 | 5 | 0 | 1 | 0 | 0 | 0 | 5:1 | 23% | 50% |
| Comparative Example 1 | 0 | 0 | 0 | 0 | 0 | 0 | 0 | 40% | 0% |
| Comparative Example 2 | 0.5 | 0 | 0 | 0 | 0 | 0 | 0 | 30% | 15% |
| Comparative Example 3 | 1 | 0 | 0 | 0 | 0 | 0 | 0 | 25% | 20% |
| Comparative Example 4 | 0 | 0 | 0 | 1 | 0 | 0 | 0 | 30% | 17% |
| Comparative Example 5 | 1 | 0 | 0 | 5.5 | 0 | 0 | 0.18:1 | 55% | 40% |
| Comparative Example 6 | 1 | 0 | 1 | 4.5 | 0 | 0 | 0.18:1 | 50% | 50% |
| Comparative Example 7 | 12 | 0 | 1 | 0 | 0 | 0 | 12:1 | 80% | 25% |
| Comparative Example 8 | 1 | 0 | 0 | 1 | 0 | 2 | 0.3:1 | 40% | 15% |

In Table 1, TESS is bis(triethylsilyl sulfate) (Chemical Formula 1a),

TMSES is trimethylsilyl ethane sulfonate (Chemical Formula 3a),

ESA is ethylene sulfate,

PST is 1,3-propene sultone,

MMDS is methylene methanedisulfonate,

PSA is propylene sulfate of Chemical Formula 10.

[Chemical Formula 1a]

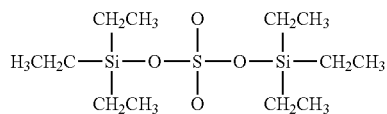

0.5:1 to 5:1 exhibited a low high-temperature resistance variation rate and a high gas decrease rate.

On the contrary, Comparative Example 1 using an electrolyte including no first and second additives exhibited a high high-temperature storage resistance variation rate and no gas reduction.

In addition, Comparative Examples 2 and 3 using an electrolyte including the first additive alone and Comparative Example 4 using an electrolyte including the second additive alone exhibited a little low high-temperature storage variation rate and a little low gas decrease rate.

Comparative Examples 5 and 6 using an electrolyte including the first and second additives but using them in a mixing ratio of 0.18:1 out of the weight ratio range of 0.2:1 to 10:1 exhibited an appropriate gas decrease rate but a very high high-temperature storage resistance variation rate.

In addition, Comparative Example 8 using an electrolyte including propylene sulfate as the second additive exhibited a high high-temperature storage variation rate and a low gas decrease rate.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

Therefore, the aforementioned embodiments should be understood to be exemplary but not limiting the present invention in any way.

The invention claimed is:

1. A non-aqueous electrolyte for a lithium secondary battery, comprising
  a non-aqueous organic solvent;
  a lithium salt;
  a first additive including at least one of compounds represented by Chemical Formulae 1 to 4; and
  a second additive, the second additive including ethylene sulfate, methylene methane disulfonate, 2,4-butane sultone, propylene sulfite, or a combination thereof,
  wherein a mixing ratio of the first additive and the second additive is a weight ratio of 0.2:1 to 10:1:

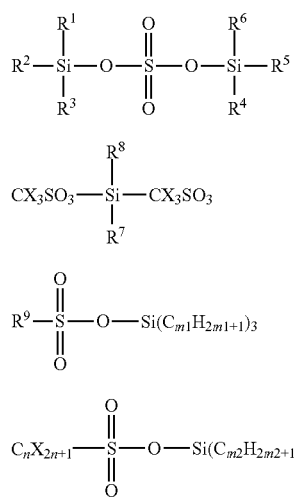

[Chemical Formula 1]

[Chemical Formula 2]

[Chemical Formula 3]

[Chemical Formula 4]

wherein, in Chemical Formulae 1 to 4, $R^1$ to $R^9$ are independently a primary, secondary, or tertiary alkyl group, an alkenyl group, or an aryl group, X is hydrogen or a halogen atom,
  n is an integer of 0 to 3, and
  m1 and m2 are independently integers of 0 to 3.

2. The non-aqueous electrolyte of claim 1, wherein a mixing ratio of the first additive and the second additive is a weight ratio of 0.5:1 to 5:1.

3. The non-aqueous electrolyte of claim 1, wherein the second additive comprises a first cyclic additive including the ethylene sulfate, methylene methane disulfonate, 2,4-butane sultone, propylene sulfite, or combination thereof and a second cyclic additive comprising a cyclic compound, the first cyclic additive and the second cyclic additive being different from each other.

4. The non-aqueous electrolyte for a lithium secondary battery of claim 3, wherein a mixing ratio of the first cyclic additive and the second cyclic additive is a weight ratio of 0.5:1 to 1:1.

5. The non-aqueous electrolyte for a lithium secondary battery of claim 1, wherein a content of the first additive is 0.5 wt % to 5 wt % based on a total weight of the electrolyte.

6. The non-aqueous electrolyte for a lithium secondary battery of claim 1, wherein a content of the second additive is 0.5 wt % to 5 wt % based on a total weight of the electrolyte.

7. The non-aqueous electrolyte for a lithium secondary battery of claim 1, wherein the first additive is the compound represented by Chemical Formula 1, the compound represented by Chemical Formula 3, or a combination thereof.

8. A lithium secondary battery comprising
  a negative electrode including a negative active material;
  a positive electrode including a positive active material; and
  the non-aqueous electrolyte of claim 1.

9. The lithium secondary battery of claim 8, wherein the positive active material is a lithium nickel-based compound.

10. The lithium secondary battery of claim 9, wherein the positive active material is a lithium nickel-based compound of Chemical Formula 5:

Chemical Formula 5

$Li_{a1}Ni_{x1}Co_{y1}Mn_{z1}O_2$

In Chemical Formula 5,
  $0.9 \leq a1 \leq 1.1$, $0.6 \leq x1 \leq 0.9$, $0 \leq y1 \leq 0.3$, $0 \leq z1 \leq 0.3$, and $x1+y1+z1=1$.

* * * * *